Patented Jan. 5, 1932

1,839,449

UNITED STATES PATENT OFFICE

EDWIN SUTERMEISTER AND JOSEPH A. WARREN, OF WESTBROOK, MAINE, ASSIGNORS TO S. D. WARREN COMPANY, OF BOSTON, MASSACHUSETTS, A CORPORATION OF MASSACHUSETTS

PAPER MANUFACTURE

No Drawing. Application filed April 7, 1928. Serial No. 268,368.

Our invention relates to the manufacture of sized and filled paper. We employ herein the words "sized" and "sizing" to define a treatment of paper in its manufacture which renders an otherwise bibulous paper web relatively resistant to reception and absorption of liquid such as writing ink.

Furthermore our invention has for its object the employment as filling material for sized paper the alkaline compounds of alkaline earth metals, of which calcium carbonate is an example and which, if introduced into paper material in the beater with the usual rosin size, so acts as to defeat the ultimate object which is to produce an acceptable filled and sized paper. Heretofore it has been found impracticable to employ any of the said compounds as filler materials for sized paper; our invention herein described is characterized by the association with such material as calcium carbonate and the other ingredients of the batch of paper of a corrective or protective material which will enable the paper to be properly filled with the comminuted solid material and at the same time adequately and acceptably sized.

For purposes of description and exemplification we take calcium carbonate as representative of alkaline compounds of alkaline earth metals for the practical reason that this material in the form of waste lime mud is abundantly available to many paper manufacturers.

First prepare waste lime mud by washing it, first with a solution of soda ash to convert to carbonate any slaked lime which may be present, and afterward with water until the mud is substantially free from readily soluble impurities such as caustic soda and sodium carbonate. This purification of the lime mud may be facilitated by agitating the mass with a small quantity of acid, such as hydrochloric acid, which will form soluble salts with the free alkali present, and thereafter washing the material until it is free from such salts. After such preparation of the lime mud the aqueous suspension or sludge is screened to remove any large particles or lumps that may be in it. Then add to the calcium carbonate sludge an emulsion of a soap-forming compound of a fatty acid radical, which is capable of chemically combining with the calcium carbonate to form an insoluble coating, water-repellent if and when dry, using from 1 to 3 parts by weight of the fatty acid radical, on 100 parts of the calcium carbonate. The fatty acid radical may be introduced either in the form of an emulsion of one or more of the fatty acids (which in the free condition are of low solubility), by means of an emulsifying agent (such as the sulfonic compounds of the fatty acids) or in the form of a true solution of a salt or salts which may be obtained by saponifying to form a suitable soluble compound, as of the alkali metals. Agitate and heat this mixture. The reaction between the calcium carbonate particles and the fatty acid forms an insoluble coating attaching to and surrounding each of the calcium carbonate particles. Well known examples of the fatty acid radicals are those of the oleates, stearates, or palmitates, mentioned in Clapp's United States Patent, No. 1,345,746, dated July 6, 1920, as forming calcium soap by reaction on calcium hydroxid.

Prepare a batch in the beater and add thereto wet calcium carbonate sludge modified as above described in such a quantity as to furnish 30 parts by weight of the said calcium carbonate to each 50 parts of fibre in the batch; add also a rosin size containing the equivalent of 1½ parts rosin. After the above materials have been thoroughly mixed by the beater action, add 3 parts of alum in solution before the charge is run on the paper machine.

The material with which the particles of calcium carbonate were coated in the preparatory process (doubtless an insoluble calcium soap) serves as a protective against that characteristic action of the calcium carbonate itself which is, unless so qualified, detrimental to the production of rosin sized paper. The paper made as above described is not thoroughly amenable to steam drying and should be air dried if a good quality of sized paper is to result.

We claim:
1. Method of making filled and sized paper, characterized by employing as a filler a car- bonate of an alkaline earth metal of which the particles are coated with the product of reaction between said carbonate and a fatty acid radical, and rosin as sizing material.

2. Method of making filled and sized paper, characterized by employing as a filler a carbonate of an alkaline earth metal of which the particles are coated with the product of reaction between said carbonate and a fatty acid radical, rosin as sizing material, and alum as a precipitant.

3. Method of making filled and sized paper, characterized by employing calcium carbonate as a filler, of which the particles are coated with the product of reaction between said carbonate and a fatty acid radical, and rosin as sizing material.

4. Method of making filled and sized paper, characterized by employing calcium carbonate as a filler, of which the particles are coated with the product of reaction between said carbonate and a fatty acid radical, rosin as sizing material, and alum as a precipitant.

5. Sized and filled paper containing as a filler a carbonate of an alkaline earth metal of which the particles are coated superficially with the product of reaction between said particles and a fatty acid radical, and rosin as sizing material.

6. Sized and filled paper containing calcium carbonate as a filler, of which the particles are coated superficially with the product of reaction between said carbonate and a fatty acid radical, and rosin as sizing material.

Signed by us at Westbrook, Maine this fifth day of April, 1928.

EDWIN SUTERMEISTER.
JOSEPH A. WARREN.